United States Patent
Burghardt et al.

(10) Patent No.: US 7,502,704 B2
(45) Date of Patent: Mar. 10, 2009

(54) METHOD FOR MONITORING THE PRESSURE OF MOTOR VEHICLE TIRES

(75) Inventors: Joerg Burghardt, Boeblingen (DE); Wolfgang Kiesewetter, Altdorf (DE); Jan Kipping, Stuttgart (DE); Frank Schlosser, Weissach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/583,443

(22) PCT Filed: Dec. 11, 2004

(86) PCT No.: PCT/EP2004/014137

§ 371 (c)(1),
(2), (4) Date: Mar. 7, 2007

(87) PCT Pub. No.: WO2005/063511

PCT Pub. Date: Jul. 14, 2005

(65) Prior Publication Data

US 2007/0186634 A1    Aug. 16, 2007

(30) Foreign Application Priority Data

Dec. 20, 2003  (DE) .................... 103 60 122

(51) Int. Cl.
*G06F 19/00* (2006.01)
*G01C 25/00* (2006.01)
(52) U.S. Cl. .................... 702/98; 702/99; 702/116; 702/188; 701/29
(58) Field of Classification Search ........... 702/98–101, 702/47, 58, 81, 82, 116, 141, 188–191, 193; 340/442, 447, 443; 701/29–35; 73/146; 116/34 B; 152/415–431
See application file for complete search history.

(56) References Cited

U.S. PATENT DOCUMENTS

| 5,694,111 A | 12/1997 | Huang |
| 5,774,048 A | 6/1998 | Achterholt |
| 6,118,369 A * | 9/2000 | Boesch ................ 340/443 |
| 6,868,358 B2 * | 3/2005 | Brown, Jr. ............ 702/138 |
| 2002/0024432 A1 * | 2/2002 | Lin et al. ............. 340/442 |

FOREIGN PATENT DOCUMENTS

| DE | 43 03 583 A1 | 8/1994 |
| DE | 101 36 831 A1 | 3/2002 |
| DE | 101 05 641 A1 | 8/2002 |
| DE | 102 37 699 A1 | 7/2003 |

* cited by examiner

OTHER PUBLICATIONS

International Search Report dated Feb. 25, 2005 including English Translation of relevant portion (Four (4) pages).

*Primary Examiner*—Eliseo Ramos Feliciano
*Assistant Examiner*—Phuong Huynh
(74) *Attorney, Agent, or Firm*—Crowell & Moring LLP

(57) ABSTRACT

A method for monitoring the pressure of motor vehicle tires is provided. In the method, a tire pressure value of the tire filling pressure and a tire temperature value are determined. While taking into account the tire temperature value, the determined tire pressure value is compared with a stored nominal value and the comparison result is used to determine whether the motor vehicle tire is at an incorrect tire pressure, in particular, a low tire pressure. If the tire pressure is incorrect when a characteristic change in the tire pressure occurs, the stored nominal value is replaced by a new nominal value, and the comparison result is used to determine the new nominal value of the determined tire pressure value.

13 Claims, 2 Drawing Sheets

METHOD FOR MONITORING THE PRESSURE OF MOTOR VEHICLE TIRES

CROSS REFERENCE TO RELATED APPLICATIONS

This is a national stage application of PCT International Application No. PCT/EP2004/014137, filed on Dec. 11, 2004, which claims priority under 35 U.S.C. § 119 to German Patent Application No. 103 60 122.8 filed Dec. 20, 2003, the entire disclosures of which are herein expressly incorporated by reference.

BACKGROUND AND SUMMARY OF THE INVENTION

The present invention relates to a method for monitoring the pressure of motor vehicle tires.

Various apparatuses and methods for monitoring the pressure of motor vehicle tires are known from modern vehicles or from the related art. For example, U.S. Pat. No. 5,694,111 describes a tire pressure indicator in which the pressure data detected by a pressure sensor is compared with a predetermined operating pressure range. An abnormal state of the air pressure is indicated as a function of the comparison result.

German patent document DE 101 36 831 A1 discloses a method and an apparatus for monitoring the pressure of pneumatic tires, and for detecting an abnormal state of the pressure and/or the temperature of the individual tires of the vehicle. The pressure and/or the temperature of the individual tires on the vehicle are/is monitored, and it is possible to distinguish between individual pneumatic tires on the vehicle, in order to verify which tire is in an abnormal state. It is also known from German patent document DE 101 36 831 A1 to have a monitoring apparatus controlled by operation of the vehicle key, or for the monitoring apparatus to be used to compare the present state of the tire with the state of the tire when the motor vehicle was started. If the difference between the air pressure values is greater than a predetermined value, the tire is classified as being in a slow leakage state.

German patent document DE 101 05 641 A1 discloses a tire pressure monitoring system which combines a direct measuring system including a pressure sensor with an indirect measuring system based on a wheel rotation speed sensor system. In the case of this tire pressure monitoring system, the indirect measuring system is calibrated by using the detected tire pressure values of the direct measuring system. There is no need for manual calibration of the direct measuring system, for example, by manually inputting tire pressure values and subsequent operation of a calibration key.

A method for monitoring the pressure of motor vehicle tires during which a tire pressure value indicative of the tire filling pressure is determined is known from modern motor vehicles. The determined tire pressure value is compared with a stored nominal value, and the comparison result is used to deduce whether the motor vehicle tire is at an incorrect tire pressure.

Against the background of this prior art, an object of the present invention is to specify a method for monitoring the pressure of motor vehicle tires, which is more reliable and can be carried out more easily and more conveniently for the driver.

This and other objects and advantages are achieved by the method according to the invention, in which a tire pressure value that describes the tire filling pressure is determined, in order to monitor the pressure of motor vehicle tires. The determined tire pressure value is compared with a stored nominal value. The comparison result is used to deduce whether the motor vehicle tire is at an incorrect tire pressure, in particular, a low tire pressure. In the case of a characteristic change in the tire pressure, the stored nominal value is replaced by a new nominal value, with the determined tire pressure value being used to determine the new nominal value. Various predetermined criteria can be checked in order to determine whether a characteristic change has occurred in the tire pressure. An advantage of the method according to the present invention is that it can be carried out fully automatically, while taking into account any change which may have occurred deliberately in the tire air pressure, for example, as a result of a tire being filled or as a result of a tire change. In particular, in a situation such as this, there is no need for initialization, the inputting of values or calibration by the driver. This means that the method according to the present invention is not only more reliable but is also more convenient.

In order to take account of the relationship between the tire pressure and the tire temperature or the temperature of the tire filling means, a tire temperature value can additionally be determined and can be used for correction or normalization of the tire pressure. In the same way, the nominal value can be normalized with respect to a temperature value, or can be stored as a temperature-dependent value. Overall, the method according to the present invention can be carried out in such a way that the tire temperature value or the tire temperature values are taken into account for all pressure values. In particular, all pressure values may be temperature-compensated.

In one refinement of the method according to the present invention, the determined tire pressure value is compared with a stored comparison pressure value, which was determined at an earlier time, with the tire temperature value being taken into account, to determine whether a characteristic change has occurred in the tire filling pressure. A characteristic change in the tire filling pressure occurs in particular when the difference between the determined tire pressure value and the stored comparison pressure value is greater than a predetermined threshold value.

In another refinement of the method, a characteristic change in the tire filling pressure occurs when the difference between the determined tire pressure value and the stored comparison pressure value is greater than a predetermined threshold value for at least two wheels. This threshold value may be chosen to be relatively small, for example, between 0.1 bar and 0.4 bar. The pressure differences may be temperature-compensated.

In a further refinement of the method, a characteristic change in the tire filling pressure occurs only when the vehicle has been stopped or restarted between the time of the determined tire pressure value and the earlier time of storage of the stored comparison pressure value.

In one embodiment of the method, the determined tire pressure value is also subjected to a plausibility check, with a new nominal value being stored only when the determined tire pressure value is classified as being plausible.

In one refinement of this, a tire pressure value such as this is classified as being plausible only if the difference between this first tire pressure value and a further tire pressure value associated with the same vehicle axle and the opposite vehicle side is less than a predetermined threshold value, for example less than 0.4 bar.

Alternatively or additionally, it is possible for plausibility to check whether all of the determined tire pressure values are above a predetermined threshold value. By way of example, a tire pressure value is classified as being plausible only when all of the determined tire pressure values are greater than 1.6 bar.

In a further refinement, a tire pressure value is classified as being plausible only when the determined tire pressure value associated with the rear vehicle axle is greater than the mean value of the determined tire pressure values associated with the front vehicle axle, minus a predetermined constant, in which case, in particular, the constant may be equal to zero.

As a further criterion for plausibility of a determined tire pressure value, it is possible to check whether the difference between the determined tire temperature and an ambient temperature is less than a predetermined threshold value. By way of example, a tire pressure value is classified as plausible only when the difference between the determined tire temperature and a determined ambient temperature is less than 40° C.

The plausibility conditions described in the above paragraphs can additionally be linked to a time criterion. For example, a tire pressure value is classified as being plausible only when the respective plausibility conditions are satisfied at least for a time period associated with them, e.g., for at least five minutes. A characteristic change in the tire filling pressure occurs in particular when the tire filling pressure of one or more tires on the vehicle has been reset by the driver or by someone else, and/or the tires have been filled with air, or one or more wheels on the vehicle have been replaced. Other criteria which indicate such a deliberate change in the tire air pressure of a vehicle tire may be checked in addition to or as an alternative to the criteria mentioned above, and may be used as a decision criterion or plausibility criterion.

The method according to the present invention may be carried out in order to monitor the pressure of all of the vehicle tires. If the method is carried out for a plurality of vehicle tires, a separate nominal value may be associated with each tire individually, or with each tire pair arranged on one axle.

Other objects, advantages and novel features of the present invention will become apparent from the following detailed description of the invention when considered in conjunction with the accompanying drawings.

DETAILED DESCRIPTION OF THE DRAWINGS

Figure 1:
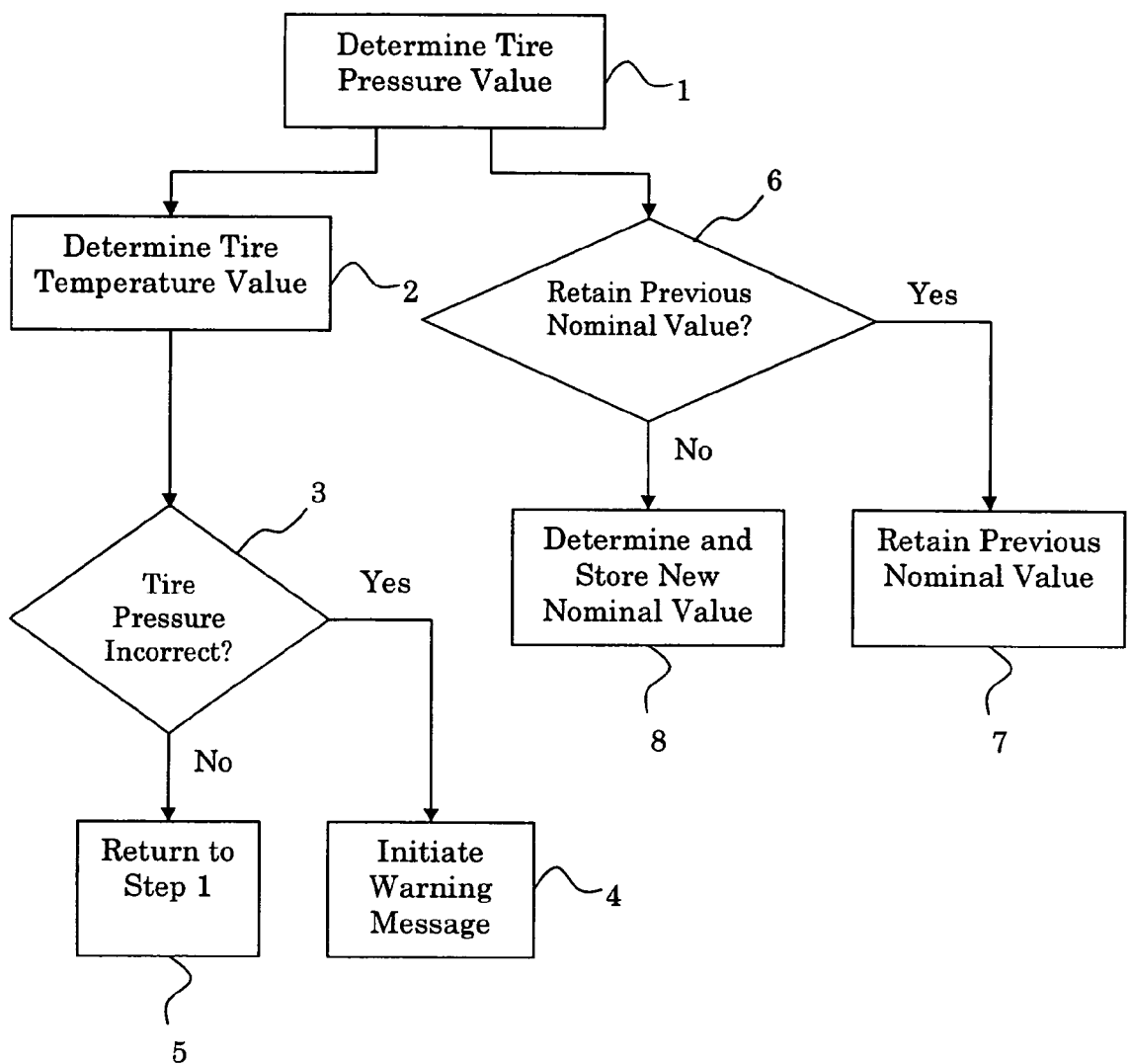
FIG. 1 illustrates an exemplary embodiment of a method for monitoring the pressure of motor vehicle tires.

FIG. 1 illustrates an exemplary embodiment of a method for monitoring the pressure of motor vehicle tires. A tire pressure value which describes the tire filling pressure is determined in step 1. A tire temperature value which describes the tire temperature is determined in step 2. A process is carried out in step 3, using the values determined in step 1 and step 2, to determine whether the tire pressure is incorrect. For this purpose, the determined tire pressure value is compared with a stored nominal value, with the tire temperature value being taken into account. If there is a considerable discrepancy between the tire pressure value and the nominal value, then a jump is made to step 4 in order to initiate an auxiliary measure, for example the emission of a warning message to the driver. If the tire pressure is found not to be incorrect in step 3, then a jump is made to step 5, in which this method branch can be ended in order subsequently, for example, to restart the method.

In parallel with the method branch described above, a process is carried out in step 6 to determine whether the previous nominal value will be retained, or a new nominal value will be stored. At least the tire pressure value determined in step 1 is used for this purpose. However, further variables may additionally be used to determine a nominal value in step 6. In particular, the tire temperature determined in step 2 may be used in step 6.

If it is found in step 6 that the previous nominal value should be retained unchanged, then a jump is made to step 7, in which this method branch can be ended. If the check in step 6 shows that the nominal value should be changed, then a jump is made to step 8, in which a new nominal value is determined and stored. The tire pressure value determined in step 1 is used for this purpose. In addition, further variables, such as the tire temperature determined in step 2, may be used.

The nominal value determined and stored in step 8 is used in step 3 in order to determine whether the tire pressure is incorrect.

As an alternative to carrying out steps 3 and 6 in parallel, they may also be carried out in series one after the other, that is to say with step 3 being carried out before step 6, or step 3 being carried out after step 6. The steps 3 and 6 may also be carried out with a completely different time arrangement between them.

Figure 2:
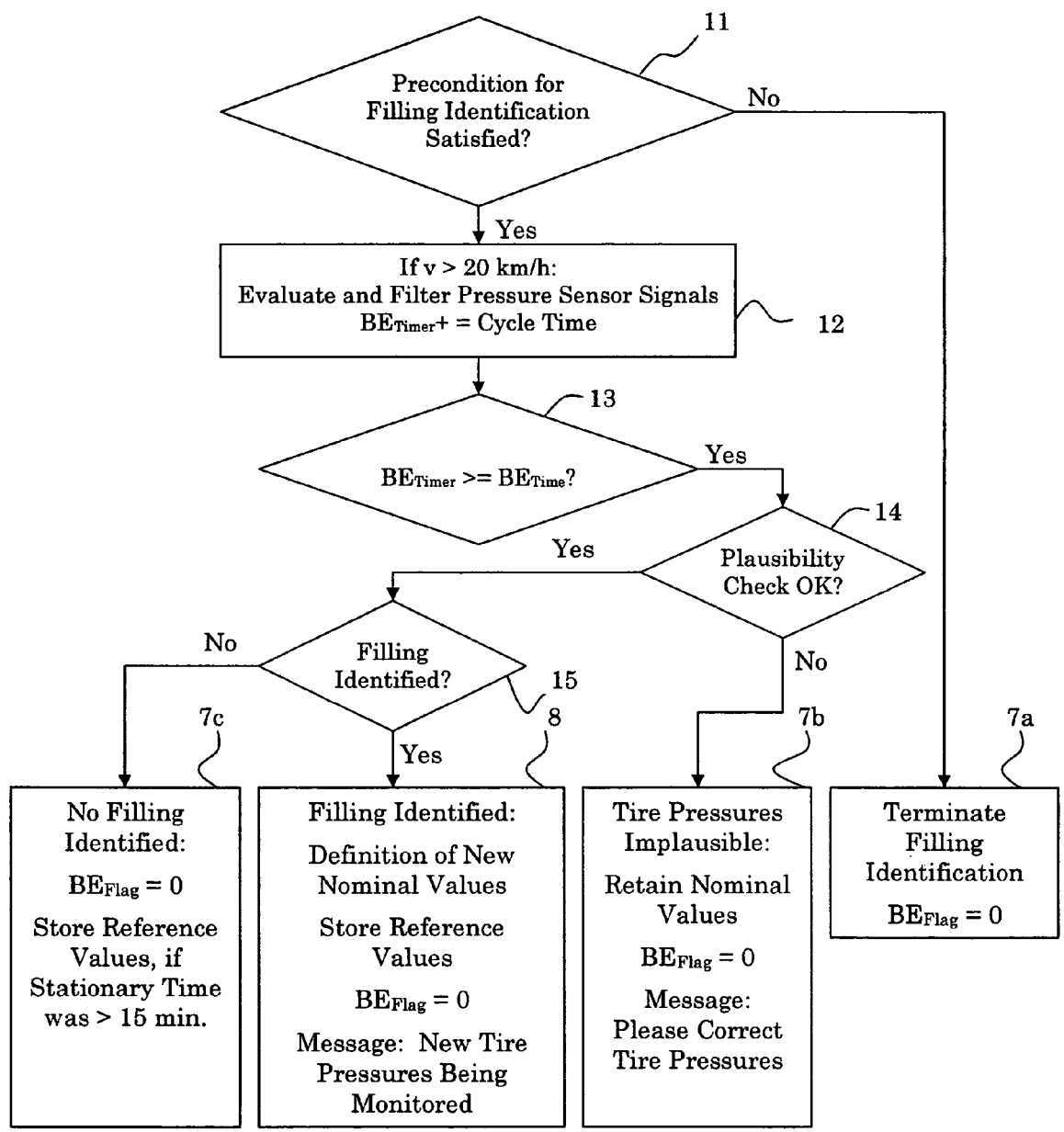
FIG. 2 illustrates an exemplary embodiment of a method in which a check is carried out to determine whether a characteristic change has occurred in the tire pressure.

FIG. 2 shows a refinement of the method steps 6 to 8 that are known from FIG. 1, i.e., a refinement of the part of the method in which a check is carried out to determine whether a characteristic change has occurred in the tire pressure. The method step 6 is, in this case, described in more detail by the steps 11 to 15. In this refinement shown in FIG. 2, the nominal value for the tire pressure is intended to be changed precisely when correction has been identified, e.g., a vehicle tire being filled with air. Instead of filling, a deliberate change to the tire filling pressure can also be identified as a correction. For example, a pressure reduction or a tire change may be the reason for a change in the nominal value.

In step 11, one or more conditions are checked to determine whether the method is carried out further. Examples of conditions such as these are that the ignition has been restarted following the vehicle having been stationary for a predetermined time, e.g., for at least three minutes, a wheel sensor has detected a pressure change when the vehicle was stationary, or a wheel that has newly been fitted to the vehicle is detected after driving starts. Further conditions may be that the tire temperature is within a predetermined temperature range, a detected tire pressure changes by at most a predetermined value within a predetermined observation time period, or a detected tire pressure is above a predetermined minimum pressure. If one of the predetermined conditions is not satisfied, then a jump is made to step 7a, and the method is terminated.

If all of the predetermined conditions checked in step 11 are satisfied, then a jump is made to step 12, in which the tire pressure values determined in step 1 are used as a function of possible further conditions, such as a predetermined minimum speed. In this case, the tire pressure values that are used may be used, evaluated, filtered or processed further in some other way, directly.

In the next step 13, a time criterion can be predetermined, so that the method is continued only if all of the conditions required for this purpose are satisfied for a predetermined minimum time period, e.g., three minutes. If the time criterion is satisfied, then step 13 is followed by a plausibility check being carried out in step 14.

The plausibility check in step 14 can be designed such that a check is carried out for each tire to determine whether each tire has a minimum pressure that is specific for that type. Alternatively or additionally, it is also possible to check whether a tire has a predetermined axle-specific minimum pressure. A further alternative or supplementary plausibility condition is that the pressure difference between two tires is not greater than a predetermined minimum pressure, which by way of example, can be preset to between 1.0 and 1.5 bar. A maximum permissible pressure difference between two tires on the same axle can be predetermined as a further plausibility condition. A maximum permissible pressure difference such as this is preset, for example, to be 0.5 to 1 bar. Furthermore, it is possible to predetermine as a pressure criterion that the tire pressure of a tire on the rear axle is, for example, at most 0.5 bar less than the mean value of the tire pressure of the tires on the front axle.

If a plausibility criterion is not satisfied (that is, the plausibility check in step 14 shows that a tire pressure is implausible), a jump is made to 7b. In step 7b, the method for tire pressure monitoring is terminated and a warning message can be emitted, so that the driver is informed of the implausible tire pressure state. For example, the driver may be requested to check the tire pressures. The method can also be carried out once again from step 7b before emitting a message to the driver.

If the plausibility check in step 14 shows that the tire pressure values are plausible, then a jump is made to step 15. A check is carried out in step 15 to determine whether a tire pressure has been corrected by means of filling. For this purpose, a tire pressure value which has been determined and stored for one wheel at an earlier time is compared with the currently determined tire pressure value for that wheel. If a comparison such as this for at least two wheels shows a pressure increase or pressure decrease by a predetermined value, for example 0.2 bar, then it is deduced that the tire pressure has been corrected. In this context, the expression correction also means a deliberate reduction in the tire pressure by the driver. Temperature-compensated tire pressure values may be used for identification of the correction of the tire pressure in step 15, as throughout the entire method.

It is also possible to deduce that the tire pressure has been corrected if the tire pressure on one wheel for which a tire pressure warning has been emitted has been changed by at least a predetermined value, e.g., has been increased by at least 0.2 bar. In this case, the comparison value is the tire pressure value determined and stored at the time of the warning.

If no correction of a tire pressure is found in step 15, then a jump is made to step 7c, and the method is terminated or is started again. In addition, the determined tire pressure values can be retained, or stored as reference values. Once again, additional conditions may be checked for this purpose.

If a correction to a tire pressure is identified in step 15, a jump is made to step 8. A new nominal value associated with a wheel is stored in step 8. This stored nominal value is used as the new comparison value for the tire pressure check. A plurality of new nominal values for a plurality of wheels may, of course, also be stored. In addition, an information message can be emitted for the driver, informing the driver that changed tire pressures will be monitored in the future. In this case, the pressures may be explicitly indicated to the driver.

The method part described in FIG. 2 or a method subsection in FIG. 2 may be carried out on a time-controlled basis and, for example, carried out once or more per second. In particular, the described method procedure in step 11 is started regularly, for example once per second.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for monitoring the pressure of motor vehicle tires, comprising the acts of:
  determining a tire pressure value indicative of a tire filling pressure;
  comparing the determined tire pressure value with a stored nominal value; and
  determining whether a motor vehicle tire is at an incorrect tire pressure, based upon a result of the comparison;
  wherein the comparison of the determined tire pressure value with the stored nominal value, determined at an earlier time, is used to determine whether a filling process characteristic change has occurred in the tire pressure value,
  wherein one or more conditions are checked as a precondition for identification of the tire filling pressure, including at least one of the ignition having been restarted following the vehicle having been stationary, a wheel sensor detected a pressure change when the vehicle was stationary, and a wheel that has newly been fitted to the vehicle is detected,
  wherein the characteristic change in the tire pressure value occurs when the difference between the determined tire pressure value and the stored nominal value is greater than a predetermined threshold value for at least two wheels, and
  wherein, when the tire pressure changes in a manner characteristic of a filling process, the stored nominal value is replaced by a new nominal value if the determined tire pressure value is classified as plausible.

2. The method as claimed in claim 1, wherein the threshold value is 0.2 bar.

3. The method as claimed in claim 1, wherein the characteristic change in the tire pressure value occurs only when the vehicle has been stopped or started between a time of determination of the determined tire pressure value and the earlier time of storage of the stored nominal value.

4. The method as claimed in claim 1, wherein:
  the determined tire pressure value is subjected to a plausibility check if the characteristic change in the tire pressure value has been determined; and
  the determined tire pressure value is stored as a comparison value only if the determined tire pressure value is classified as plausible.

5. The method as claimed in claim 4, wherein the tire pressure value is classified as plausible only if the difference between the tire pressure value and a further tire pressure value associated with a same vehicle axle and an opposite vehicle side is less than a predetermined threshold value of 0.4 bar.

6. The method as claimed in claim 4, wherein the tire pressure value is classified as plausible only when all of the determined tire pressure values are above a predetermined threshold value of 1.6 bar.

7. The method as claimed in claim 4, wherein the tire pressure value is classified as plausible only when the determined tire pressure value associated with a rear vehicle axle is greater than a mean value of determined tire pressure values associated with a front vehicle axle minus a predetermined constant.

8. The method as claimed in claim 4, wherein a tire temperature and an ambient temperature are determined, and the tire pressure value is classified as plausible only when a difference between the tire pressure and the ambient temperature is less than a predetermined threshold value of 40 K.

9. The method as claimed in claim 4, wherein the tire pressure value is classified as plausible only when the respective plausibility conditions are satisfied for at least 3 minutes.

10. The method as claimed in claim 1, wherein a tire temperature value is determined, and the tire temperature value is used for determination of the tire pressure values.

11. The method as claimed in claim 10, wherein temperature influence is compensated for in the determination of the tire pressure values.

12. The method as claimed in claim 2, wherein the characteristic change in the tire pressure value occurs only when the vehicle has been stopped or started between a time of determination of the determined tire pressure value and the earlier time of storage of the stored nominal value.

13. A method for monitoring the pressure of motor vehicle tires, comprising the acts of:
   determining a tire pressure value indicative of a tire filling pressure;
   comparing the determined tire pressure value with a stored nominal value; and
   determining whether a motor vehicle tire is at an incorrect tire pressure, based upon a result of the comparison;
   wherein the method further comprises,
      detecting changes in said determined tire pressure and a temporal course thereof;
   when the temporal course of a change in air pressure follows a pattern that is indicative of a filling of the tire by an operator, replacing the stored nominal value by a new nominal value, with the determined tire pressure value being used to establish the new nominal value.

* * * * *